Dec. 1, 1936.  W. S. BOWEN  2,062,859
SUPERCHARGING MECHANISM
Filed June 22, 1934
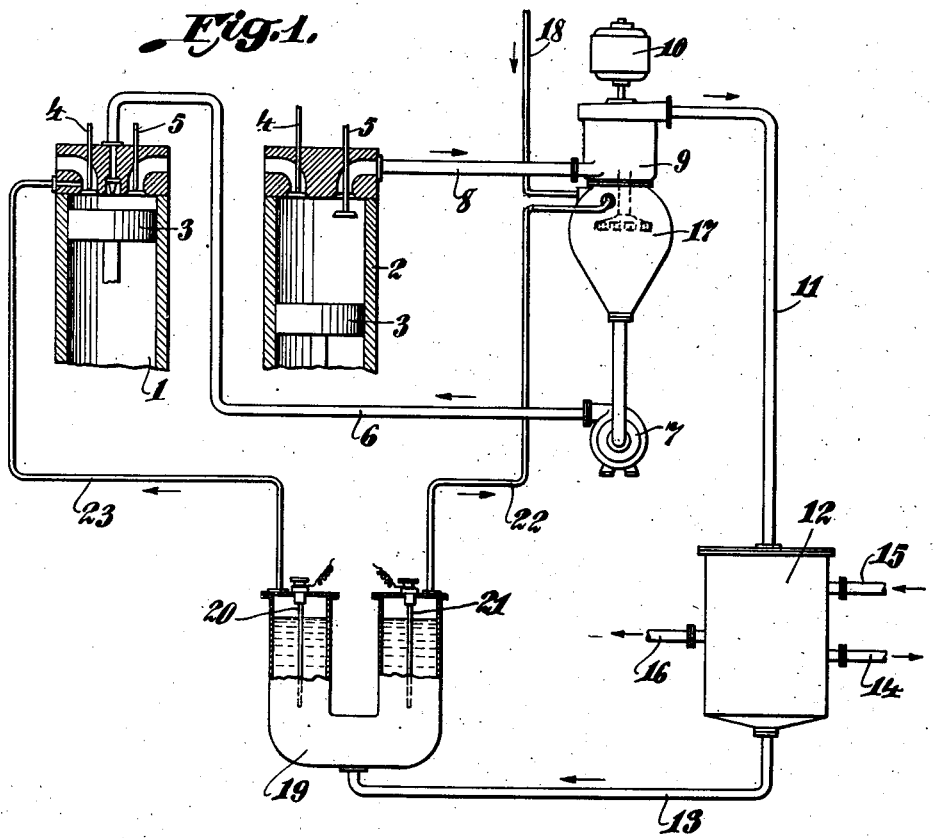
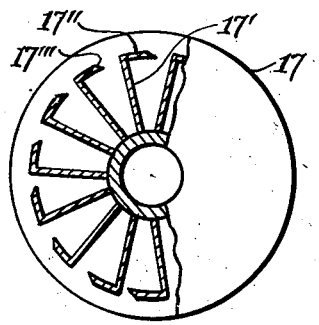
INVENTOR:
William Spencer Bowen,
BY Redding, Greeley, O'Shea & Campbell
HIS ATTORNEYS Patented Dec. 1, 1936

2,062,859

UNITED STATES PATENT OFFICE 2,062,859

SUPERCHARGING MECHANISM

William Spencer Bowen, Westfield, N. J.

Application June 22, 1934, Serial No. 731,891

3 Claims. (Cl. 123—1)

The present invention relates to internal combustion engines and embodies, more specifically, an improved device for improving the efficiency of engines of this type. More particularly, the present invention proposes to recover the moisture in the exhaust gases and decompose the same, supplying the oxygen from such decomposition directly to the air intake of the engine and combining the hydrogen resulting therefrom with the fuel oil to produce a highly explosive mixture.

It has been suggested to decompose water and supply the resulting hydrogen and oxygen to the fuel before it is supplied to an internal combustion engine. The present invention, however, supplies the hydrogen and oxygen in an entirely new manner and in such fashion as to greatly improve the rate of combustion, efficiency and mean effective pressure.

An object of the invention, accordingly, is to provide a device for improving the combustion characteristics of an internal combustion engine.

A further object of the invention is to provide a device for decomposing water and supplying the oxygen therefrom to the air intake of the engine, at the same time combining the hydrogen resulting from such decomposition with the fuel oil used in combustion.

A further object of the invention is to provide a device of the above character wherein the hydrogen resulting from the decomposition of the water is homogenized with the fuel oil and thus intimately and explosively mixed therewith.

A further object of the invention is to provide a device of the above character wherein moisture from the exhaust of an internal combustion engine is condensed and decomposed electrolytically, the products of such decomposition being utilized in the manner above outlined.

Further objects of the invention will be apparent as it is described in greater detail in connection with the accompanying drawing wherein:

Figure 1 is a diagrammatic view illustrating a device constructed in accordance with the present invention.

Figure 2 is a detail view in section taken through the homogenizing mechanism.

With reference to this figure, an engine is shown having a plurality of cylinders 1 and 2. Obviously, the number of cylinders and heads and associated elements constitute no part of the present invention. Each cylinder is provided with a piston 3, inlet valves 4 and exhaust valves 5.

Fuel is supplied to the cylinders through a fuel piping system of usual construction and from a fuel pump of standard construction, in accordance with well known and present day practice. In the interest of brevity and clearness only one fuel pipe is shown, being indicated by the reference character 6. This pipe is supplied by fuel from a fuel pump 7 and directs the fuel into the cylinder 1 through a suitable nozzle in the head thereof. Air is supplied through the inlet valves 4 the exhaust from exhaust valves 5 being directed through a suitable piping such as indicated at 8 to a turbine 9. The turbine drives an electric generator 10 through a suitable drive connection either directly or through gear reduction means.

The exhaust from the turbine 9 is directed into a pipe 11 and carried to a condenser 12, wherein the moisture in the exhaust gas is condensed and the condensate removed from the condenser through a pipe 13. The dry exhaust gases may be discharged through an outlet pipe 14 and cooling fluid may be circulated through the condenser 12 by means of inlet and exhaust pipes 15 and 16, respectively. The turbine 9 drives a homogenizing mechanism 17 which comprises a chamber at the top of which a spray head is provided formed with a plurality of edges over which the material is forced under great pressure (as by centrifugal force). The homogenizing mechanism is of standard construction and includes a plurality of blades 17' terminating in flanges 17" having sharpened cutting or shearing edges 17''' by means of which the particles may be subjected to mechanical shearing action while under great pressure. In order that the particles may be subjected to high pressure and a simultaneous internal shear in passing over the edges, this mechanism is rotated by the turbine 9 and serves to finely divide and mix or emulsify the substance directed into the mechanism. Fuel oil is thus introduced into the homogenizer 17 through an inlet pipe 18.

The water which is condensed in the condenser 12 is directed to an electrolytic cell 19 having electrodes 20 and 21. These are connected to a source of electric current in such fashion that hydrogen will be collected at the electrode 21 while oxygen is formed and collected at the electrode 20. The hydrogen escapes through a pipe 22 and is directed into the homogenizing mechanism 17, together with the fuel oil from the pipe 18. In this fashion the hydrogen and fuel oil are very finely divided and almost explosively mixed in the homogenizing mechanism.

The oxygen which is formed and collected at the electrode 20 is directed through a pipe line 23 and sucked directly into the air inlet stream on the suction stroke of the engine. In this fashion, the atmosphere within the cylinder will be very rich in oxygen. As the hydrogen is sucked into the homogenizer and passes therethrough it is thoroughly emulsified with the fuel oil and will remain in suspension for a sufficient time to enter the combustion chamber virtually as a single fluid. The fuel pump will compress the oil and entrained gas and force the same under high pressure through a nozzle in the combustion chamber where a sudden reduction of pressure tends to atomize the oil by the expansion of the entrained gas. This effect would be increased by some heating of the mixture of the oil and hydrogen under pressure.

As a result, the maximum temperature will tend to be lowered by keeping the specific heats down, at the same time improving the rate of combustion, efficiency and the mean effective pressure. Obviously, the electric generator 10 may supply the electric current for operating the electrolytic cell 19.

While the invention has been described with specific reference to the accompanying drawing, it is not to be limited, save as defined in the appended claims.

I claim as my invention:

1. A fuel charging device for an internal combustion engine comprising means to supply fuel thereto, means to condense the water vapor in the engine exhaust, electrolytic means to decompose the condensed water vapor, means to introduce the oxygen resulting from the decomposition into the air supplied to the engine, and means to mix the hydrogen resulting from the decomposition with the fuel prior to the introduction thereof into the engine.

2. A fuel charging device for an internal combustion engine comprising means to supply fuel thereto, means to condense the water vapor in the engine exhaust, electrolytic means to decompose the condensed water vapor into hydrogen and oxygen, means to introduce the oxygen resulting from the decomposition into the air supplied to the engine, means to mix and subject the particles of fuel and hydrogen resulting from the decomposition of the condensed water vapor to internal shear under high pressure, and means to supply the homogenized hydrogen and fuel to the engine under pressure.

3. The method of operating an internal combustion engine comprising condensing the moisture in the engine exhaust, decomposing the condensed moisture into hydrogen and oxygen, introducing the oxygen of decomposition into the air supplied to the engine, mixing the engine fuel with the hydrogen produced by the decomposition, and introducing the mixture of fuel and hydrogen into the engine.

WILLIAM SPENCER BOWEN.